(12) United States Patent
Sawada et al.

(10) Patent No.: US 12,537,435 B2
(45) Date of Patent: Jan. 27, 2026

(54) LATCH CIRCUIT AND POWER SUPPLY CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryohei Sawada, Yokkaichi (JP); Masaya Ina, Yokkaichi (JP); Kota Oda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 205 days.

(21) Appl. No.: 18/552,177

(22) PCT Filed: Mar. 7, 2022

(86) PCT No.: PCT/JP2022/009589
§ 371 (c)(1),
(2) Date: Sep. 24, 2023

(87) PCT Pub. No.: WO2022/202238
PCT Pub. Date: Sep. 29, 2022

(65) Prior Publication Data
US 2024/0178743 A1 May 30, 2024

(30) Foreign Application Priority Data
Mar. 25, 2021 (JP) .................. 2021-052040

(51) Int. Cl.
*H02M 1/08* (2006.01)
*H02M 3/156* (2006.01)

(52) U.S. Cl.
CPC .............. *H02M 1/08* (2013.01); *H02M 3/156* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 7,983,539 B2 * 7/2011 Pan .................... G05D 23/1917
323/283
10,063,226 B2 * 8/2018 Akahane ................ H03K 17/16
(Continued)

FOREIGN PATENT DOCUMENTS

JP H3-90131 9/1991
JP H5-129899 A 5/1993

OTHER PUBLICATIONS

International Search Report, Application No. PCT/JP2022/009589, mailed Jun. 7, 2022. ISA/Japan Patent Office.

*Primary Examiner* — Jeffrey A Gblende
(74) *Attorney, Agent, or Firm* — Honigman LLP

(57) ABSTRACT

In a first switch of a latch circuit, when the voltage between an emitter (input end) and a base (control end) has increased to a threshold voltage or more, the first switch is switched from off to on. The current that flows through a first resistor and a second resistor in that order is input to a collector (input end) of a second switch and a comparator switch. The second switch is switched on when the first switch is switched on. When the second switch or the comparator switch (third switch) is on, the voltage across the first resistor is the threshold voltage or more. A voltage is input to the emitter of the first switch from a microcomputer. A voltage is output from the collector of the second switch to a driving circuit.

5 Claims, 12 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | |
|---|---|---|
| 2002/0135344 A1 | 9/2002 | Tamai et al. |
| 2019/0123739 A1 | 4/2019 | Sugisawa |
| 2022/0224315 A1* | 7/2022 | Dong .................. H03K 3/0233 |

\* cited by examiner

Thermal circuit of wire

LATCH CIRCUIT AND POWER SUPPLY CONTROL DEVICE

CROSS-REFERENCE TO RELATED APPLICATIONS

This application is the U.S. national stage of PCT/JP2022/009589 filed on Mar. 7, 2022, which claims priority of Japanese Patent Application No. JP 2021-052040 filed on Mar. 25, 2021, the contents of which are incorporated herein.

TECHNICAL FIELD

The present disclosure relates to a latch circuit and a power supply control device.

BACKGROUND

In JP 2002-290223A, a latch circuit that is used in a vehicle to fix an output voltage is disclosed. A high-level voltage or a low-level voltage is input to the latch circuit. The latch circuit usually outputs the low-level voltage. When the voltage input to the latch circuit is switched from the low-level voltage to the high-level voltage, the latch circuit switches the output voltage from the low-level voltage to the high-level voltage. Thereafter, the latch circuit fixes the output voltage to the high-level voltage irrespective of the input voltage.

A specific configuration of a latch circuit in which one or more switches are used is not disclosed in JP 2002-290223A. In order to realize a small-sized latch circuit that can be easily installed in a vehicle, it is preferable to reduce the number of switches included in the latch circuit.

Therefore, the present disclosure aims to provide a latch circuit and a power supply control device in which the number of switches needed to fix an output voltage to a predetermined voltage is small.

SUMMARY

A latch circuit according to one aspect of the present disclosure is a latch circuit that fixes an output voltage to a predetermined voltage when a predetermined condition is satisfied. The latch circuit includes: a first switch that has an input end to which a current is input, an output end from which a current is output, and a control end, and is switched from off to on when the voltage between the input end and the control end has increased to a threshold voltage or more; a first resistor that is connected between the input end and the control end; a second resistor whose one end is connected to the control end; a second switch that has a second input end to which a resistor current that flows through the first resistor and second resistor in that order is input, and is switched on when the first switch is switched on; and a third switch to which the resistor current is input. When the second switch or third switch is on, the voltage across the first resistor is the threshold voltage or more, a voltage is input to the input end of the first switch, and a voltage is output from the second input end of the second switch.

A power supply control device according to one aspect of the present disclosure is a power supply control device that controls power supply through a power supply switch. The power supply control device includes: a voltage adjusting unit that is configured to output a voltage, and adjust the voltage to be output (output voltage); a latch circuit configured to output a voltage according to an output voltage of the voltage adjusting unit until a predetermined condition is satisfied, and fix its output voltage to a predetermined voltage when a predetermined condition is satisfied; and a switching circuit configured to switch the power supply switch on or off according to the output voltage of the latch circuit. The latch circuit includes: a first switch that has an input end to which a current is input, an output end from which a current is output, and a control end, and is switched from off to on when the voltage between the input end and the control end has increased to a threshold voltage or more; a first resistor that is connected between the input end and the control end; a second resistor whose one end is connected to the control end; a second switch that has a second input end to which a resistor current that flows through the first resistor and second resistor in that order is input, and is switched on when the first switch is switched on; and a third switch to which the resistor current is input. When the second switch or third switch is on, the voltage across the first resistor increases. The output voltage of the voltage adjusting unit is input to the input end of the first switch. A voltage is output to the switching circuit from the second input end of the second switch.

Advantageous Effects

According to the present disclosure, the number of switches needed to fix an output voltage to a predetermined voltage is small.

BRIEF DESCRIPTION OF DRAWINGS

FIG. 6 is a diagram illustrating a current flow when a comparator switch is on.

DETAILED DESCRIPTION OF PREFERRED EMBODIMENTS

Figure 1:
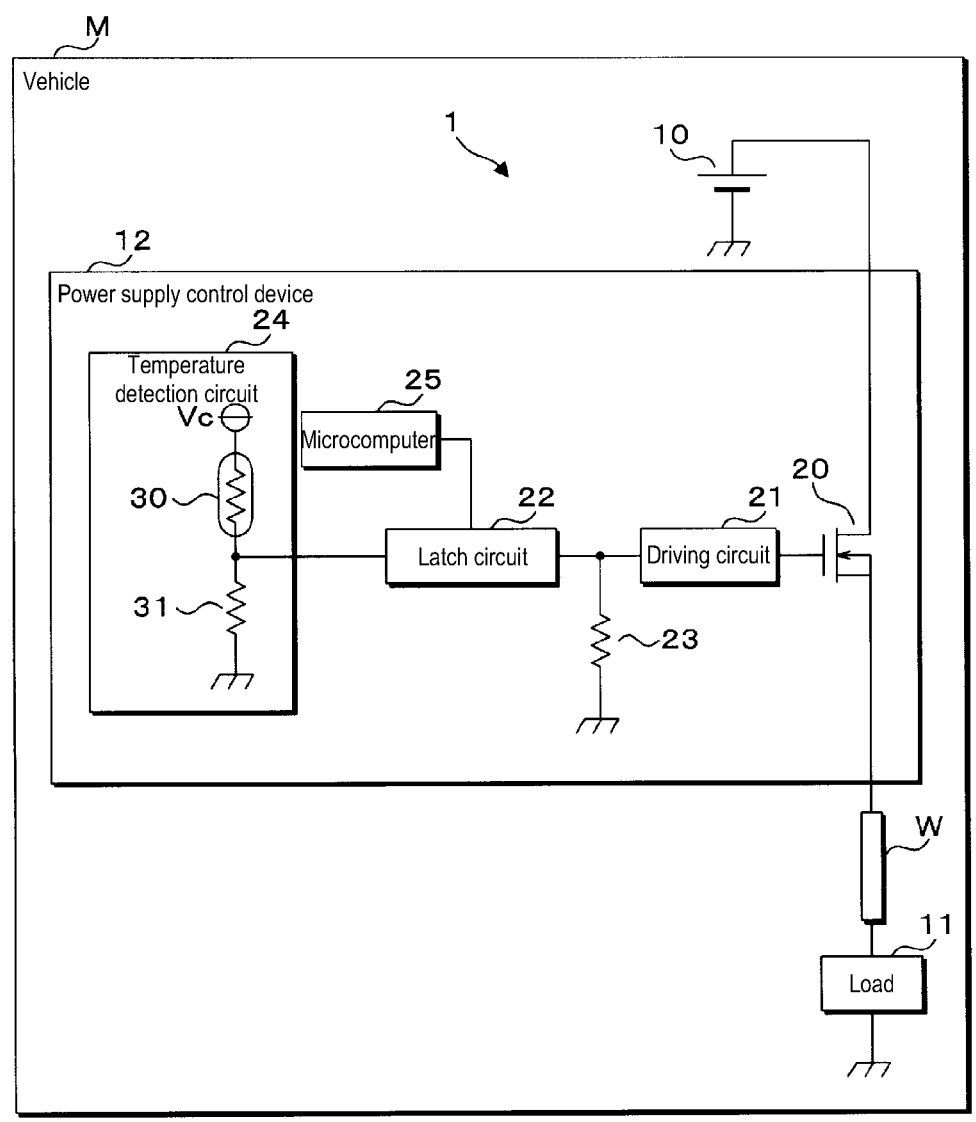
FIG. 1 is a block diagram illustrating the main configuration of a power supply system in Embodiment 1.

First, modes for carrying out the disclosure will be enumerated and described. At least some of the modes described below may be combined as necessary.

A latch circuit according to one aspect of the present disclosure is a latch circuit that fixes an output voltage to a predetermined voltage when a predetermined condition is satisfied. The latch circuit includes: a first switch that has an input end to which a current is input, an output end from which a current is output, and a control end, and is switched from off to on when the voltage between the input end and the control end has increased to a threshold voltage or more; a first resistor that is connected between the input end and the control end; a second resistor whose one end is connected to the control end; a second switch that has a second input end to which a resistor current that flows through the first resistor and second resistor in that order is input, and is switched on when the first switch is switched on; and a third switch to which the resistor current is input. When the second switch or third switch is on, the voltage across the first resistor is the threshold voltage or more. A voltage is input to the input end of the first switch. A voltage is output from the second input end of the second switch.

In the aspect above, when the first switch, second switch, and third switch are off, a voltage input to the input end of the first switch is output through the first resistor and second resistor. One end of the second switch from which a current is output is denoted as a second output end. Assume that the third switch is switched on in a state in which the voltage at the input end of the first switch relative to the potential at the second output end (the potential at the second output end being the reference potential) is a fixed voltage or more. When the third switch is on, the voltage across the first resistor is the threshold voltage or more, and the first switch is on. When the first switch is switched on, the second switch is switched on.

When the first switch is on, the second switch is on. When the second switch is on, the first switch is on. Therefore, even when the third switch is switched from on to off, the second switch is kept on, as long as the voltage at the input end of the first switch relative to the potential at the second output end of the second switch is the fixed voltage or more. As a result, the output voltage is fixed to the predetermined voltage. The predetermined voltage is a voltage at the second output end of the second switch. The number of switches needed to fix the output voltage to the predetermined voltage is three, which is a small number.

The latch circuit according to one aspect of the present disclosure further includes a third resistor and a fourth resistor. The second switch further has a second output end from which a current is output, and a second control end. The second switch is switched from off to on when the voltage between the second output end and second control end has increased to a second threshold voltage or more. The third resistor is connected between the output end of the first switch and the second control end of the second switch. The fourth resistor is connected between the second control end and second output end of the second switch. A current flows through the first switch, third resistor, and fourth resistor in that order.

In the aspect above, in the case where the voltage at the input end of the first switch relative to the potential at the second output end of the second switch is the fixed voltage, when the first switch is on, a current flows through the first switch, third resistor, and fourth resistor in that order. Accordingly, there is a voltage drop at the fourth resistor. When the first switch is switched on, the voltage between the second control end and second output end of the second switch increases to the second threshold voltage or more. As a result, the second switch is switched on.

A power supply control device according to one aspect of the present disclosure is a power supply control device that controls power supply through a power supply switch. The power supply control device includes: a voltage adjusting unit that is configured to output a voltage, and adjust the voltage to be output (output voltage); a latch circuit configured to output a voltage according to an output voltage of the voltage adjusting unit until a predetermined condition is satisfied, and fix its output voltage to a predetermined voltage when a predetermined condition is satisfied; and a switching circuit configured to switch the power supply switch on or off according to the output voltage of the latch circuit. The latch circuit includes: a first switch that has an input end to which a current is input, an output end from which a current is output, and a control end, and is switched from off to on when the voltage between the input end and the control end has increased to a threshold voltage or more; a first resistor that is connected between the input end and the control end; a second resistor whose one end is connected to the control end; a second switch that has a second input end to which a resistor current that flows through the first resistor and second resistor in that order is input, and is switched on when the first switch is switched on; and a third switch to which the resistor current is input. When the second switch or third switch is on, the voltage across the first resistor increases. The output voltage of the voltage adjusting unit is input to the input end of the first switch. A voltage is output to the switching circuit from the second input end of the second switch.

In the aspect above, the latch circuit operates as described above. Therefore, when the first switch, second switch, and third switch are off, the output voltage of the voltage adjusting unit is output through the first resistor and second resistor of the latch circuit. The switching circuit switches the power supply switch on or off according to the output voltage of the voltage adjusting unit. In the case where the voltage at the input end of the first switch relative to the potential at the second output end of the second switch is the fixed voltage or more, when the third switch is switched on, the output voltage of the latch circuit is fixed to the predetermined voltage. As a result, the switching circuit fixes the state of the power supply switch to a state corresponding to the predetermined voltage. The number of switches needed to fix the output voltage of the latch circuit to the predetermined voltage is three, which is a small number.

In the power supply control device according to one aspect of the present disclosure, the latch circuit includes a second switching circuit configured to switch the third switch on or off, the second switching circuit switches the third switch on when the temperature difference between a wire temperature of a wire disposed on a current path of a current flowing through the power supply switch and an ambient temperature in the vicinity of the wire has increased to a predetermined temperature difference or more, and the predetermined voltage is a voltage to instruct to switch the power supply switch off.

In the aspect above, when the temperature difference regarding the wire has increased to the predetermined temperature difference or more, the third switch is switched on, and the output voltage of the latch circuit is fixed to the predetermined voltage. As a result, the power supply switch is kept off. The wire temperature of the wire is prevented from increasing to an abnormal temperature.

The power supply control device according to one aspect of the present disclosure further includes: a second switching circuit configured to switch the third switch on or off: a current output circuit configured to increase a current to be output as the current flowing through the power supply switch increases; and a temperature difference circuit configured to increase a voltage to be output as the temperature difference between a wire temperature of a wire disposed on a current path of a current flowing through the power supply switch and an ambient temperature in the vicinity of the wire increases. The output voltage of the temperature difference circuit is generated based on an output current of the current output circuit. The second switching circuit switches the third switch on when the output voltage of the temperature difference circuit has increased to a given voltage or more. The predetermined voltage is a voltage to instruct to switch the power supply switch off.

In the aspect above, when the temperature difference regarding the wire has increased to the predetermined temperature difference or more, the output voltage of the temperature difference circuit increases to the given voltage or more. Therefore, when the temperature difference regarding the wire has increased to the predetermined temperature difference or more, the third switch is switched on, and the output voltage of the latch circuit is fixed to the predetermined voltage. As a result, the power supply switch is kept off. The wire temperature of the wire is prevented from increasing to an abnormal temperature.

Specific examples of a power supply system according to embodiments of the present disclosure will be described below with reference to the drawings. Note that the present disclosure is not limited to these illustrative examples and is defined by the claims, and all changes that come within the meaning and range of equivalency of the claims are intended to be embraced therein.

Embodiment 1

Configuration of Power Supply System

FIG. 1 is a block diagram illustrating the main configuration of a power supply system 1 in Embodiment 1. The power supply system 1 is installed in a vehicle M. The power supply system 1 includes a DC power supply 10, a load 11, and a power supply control device 12. The DC power supply 10 is a battery, for example. The load 11 is an electric device. When power is supplied to the load 11, the load 11 starts operating. When power supply to the load 11 stops, the load 11 stops operating.

The power supply control device 12 includes a power supply switch 20. The power supply switch 20 is an N-channel FET. FET is an abbreviation of "Field Effect Transistor". When the power supply switch 20 is on, the resistance between the drain and source of the power supply switch 20 is sufficiently small. As a result, a current can flow through the drain and source thereof. When the power supply switch 20 is off, the resistance between the drain and source of the power supply switch 20 is sufficiently large. As a result, no current will flow through the drain and source thereof.

The drain of the power supply switch 20 is connected to a positive electrode of the DC power supply 10. The source of the power supply switch 20 is connected to one end of the load 11 through a wire W. The negative electrode of the DC power supply 10 and the other end of the load 11 are grounded. Grounding is realized by the connection to a body of the vehicle M, for example.

When the power supply switch 20 is switched from off to on, a current flows from the positive electrode of the DC power supply 10 to the power supply switch 20, the wire W, and the load 11 in that order, and power is supplied to the load 11. Accordingly, the load 11 starts operating. When the power supply switch 20 is switched from on to off, power supply from the DC power supply 10 to the load 11 stops, and the load 11 stops operating. The power supply control device 12 controls power supply from the DC power supply 10 to the load 11 through the power supply switch 20 by switching the power supply switch 20 on or off.

Configuration of Power Supply Control Device 12

The power supply control device 12 includes a driving circuit 21, a latch circuit 22, a device resistor 23, a temperature detection circuit 24, and a microcomputer 25, in addition to the power supply switch 20. The driving circuit 21 includes a voltage output end (output end) and a voltage input end (input end). The gate of the power supply switch 20 is connected to the output end of the driving circuit 21. The input end of the driving circuit 21 is connected to the latch circuit 22 and one end of the device resistor 23. The other end of the device resistor 23 is grounded. The latch circuit 22 is further connected to the temperature detection circuit 24 and the microcomputer 25.

Figure 2:
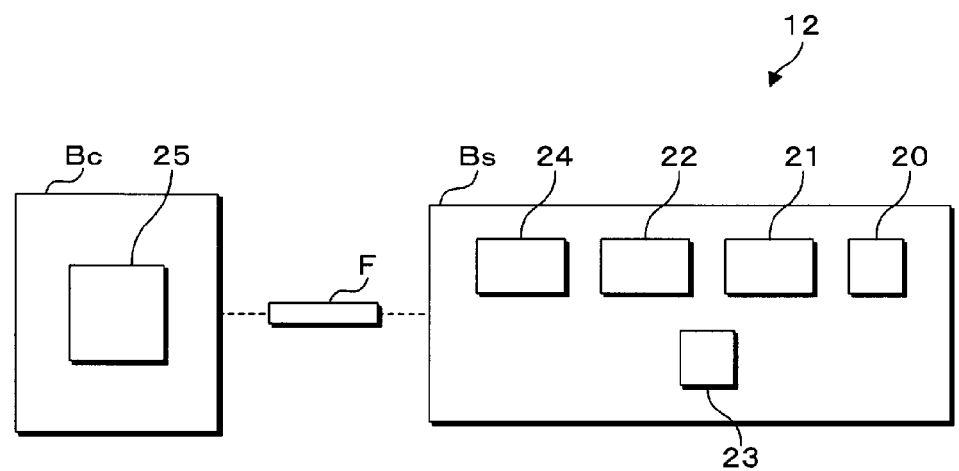
FIG. 2 is a diagram illustrating the arrangement of a plurality of constituent units included in the power supply control device.

FIG. 2 is a diagram illustrating the arrangement of a plurality of constituent units included in the power supply control device 12. The power supply control device 12 further includes a switch circuit board Bs and a control circuit board Bc. The power supply switch 20, the driving circuit 21, the latch circuit 22, the device resistor 23, and the temperature detection circuit 24 are disposed on the switch circuit board Bs. The arrangement of a circuit indicates the arrangement of one or more circuit elements constituting the circuit. The microcomputer 25 is disposed on the control circuit board Bc. The microcomputer 25 is an integrated circuit device, for example. The microcomputer 25 is connected to the latch circuit 22 through a cable F.

As shown in FIG. 1, the temperature detection circuit 24 includes a thermistor 30 and a detection resistor 31. The thermistor 30 is an NTC (negative temperature coefficient) thermistor. Therefore, as the temperature of the thermistor 30 increases, the resistance of the thermistor 30 decreases. One end of the thermistor 30 is connected to one end of the detection resistor 31. A fixed voltage Vc is applied to the other end of the thermistor 30. The fixed voltage Vc is a voltage relative to the ground potential (the ground potential being the reference potential). The other end of the detection resistor 31 is grounded. The connection node between the thermistor 30 and the detection resistor 31 is connected to the latch circuit 22.

The fixed voltage Vc is generated by a regulator, which is not illustrated, for example. The regulator generates the fixed voltage Vc by stepping down the output voltage of the DC power supply 10. The output voltage of the DC power supply 10 is a voltage that fluctuates in a range between 8 V to 12 V, for example. The fixed voltage Vc is 5 V, for example. The regulator continuously generates the fixed voltage Vc by adjusting the stepping down amount.

The fixed voltage Vc is divided by the thermistor 30 and the detection resistor 31, and the resultant divided voltage is output to the latch circuit 22 as an output voltage of the temperature detection circuit 24. The output voltage of the temperature detection circuit 24 is determined by the resistance ratio between the thermistor 30 and the detection resistor 31. As the resistance of the thermistor 30 decreases, that is, as the temperature of the thermistor 30 increases, the output voltage of the temperature detection circuit 24 increases.

The thermistor 30 is disposed on the switch circuit board Bs. Therefore, as the temperature of the switch circuit board Bs increases, the temperature of the thermistor 30 increases. As the temperature of the thermistor 30 increases, the output voltage of the temperature detection circuit 24 increases. Therefore, as the temperature of the switch circuit board Bs increases, the output voltage of the temperature detection circuit 24 increases.

As described above, the temperature detection circuit 24 detects the temperature of the switch circuit board Bs, and adjusts the output voltage to a voltage according to the detected temperature.

The microcomputer 25 outputs a voltage to the latch circuit 22. The microcomputer 25 switches its output voltage between the fixed voltage Vc and 0 V. The microcomputer 25 functions as a voltage adjusting unit for adjusting the output voltage. If the output voltage of the temperature detection circuit 24 is less than a fixed reference voltage, the latch circuit 22 outputs a voltage according to the output voltage of the microcomputer 25 to the driving circuit 21. Here, as the output voltage of the microcomputer 25 increases, the output voltage of the latch circuit 22 increases. The output voltage of the latch circuit 22 is applied across the device resistor 23. The reference voltage is larger than 0 V.

When the output voltage of the latch circuit 22 has increased to a fixed output threshold voltage or more, the driving circuit 21 switches the power supply switch 20 from off to on. Accordingly, a current flows through the power supply switch 20 and the wire W, and power is supplied to the load 11. The output threshold voltage is larger than 0 V. When the output voltage of the latch circuit 22 has decreased below the output threshold voltage, the driving circuit 21 switches the power supply switch 20 from on to off. Accordingly, power supply to the load 11 through the power supply switch 20 and the wire W stops. The driving circuit 21 functions as a switching circuit.

When the gate voltage relative to the source potential is a fixed switch threshold voltage or more, the power supply switch 20 is on. When the gate voltage relative to the source potential is less than the switch threshold voltage, the power supply switch 20 is off. The switch threshold voltage is larger than 0 V.

When switching the power supply switch 20 on, the driving circuit 21 increases the gate voltage of the power supply switch 20 relative to the ground potential. Accordingly, the gate voltage of the power supply switch 20 relative to the source potential increases to the switch threshold voltage or more. When switching the power supply switch 20 off, the driving circuit 21 decreases the gate voltage of the power supply switch 20 relative to the ground potential. Accordingly, the gate voltage of the power supply switch 20 relative to the source potential decreases below the switch threshold voltage.

When the output voltage of the temperature detection circuit 24 is less than the reference voltage, if the output voltage of the microcomputer 25 is the fixed voltage Vc, the output voltage of the latch circuit 22 is the output threshold voltage or more. Therefore, the driving circuit 21 keeps the power supply switch 20 on. In a similar case, if the output voltage of the microcomputer 25 is 0 V, the output voltage of the latch circuit 22 is 0 V, and is less than the output threshold voltage. Therefore, the driving circuit 21 keeps the power supply switch 20 off.

As described above, when the power supply switch 20 is on, a current flows through the power supply switch 20. When a current flows through the power supply switch 20, the power supply switch 20 generates heat. When the heat generation amount per unit time is larger than the heat dissipation amount per unit time, the temperature of the power supply switch 20 increases. When the temperature of the power supply switch 20 increases, the temperature of the switch circuit board Bs increases. When the temperature of the switch circuit board Bs increases, the output voltage of the temperature detection circuit 24 increases.

When the power consumed in the power supply switch 20 increases, the heat generation amount of the power supply switch 20 increases. The power consumed in the power supply switch 20 is represented by the product of the square of the current flowing through the power supply switch 20 and the on-resistance of the power supply switch 20. Therefore, as the current flowing through the power supply switch 20 increases, the heat generation amount increases.

When the output voltage of the microcomputer 25 is the fixed voltage Vc, if the output voltage of the temperature detection circuit 24 has increased to the reference voltage or more, the latch circuit 22 forcibly reduces its output voltage to 0 V. Accordingly, the driving circuit 21 forcibly switches the power supply switch 20 off. When the power supply switch 20 is switched off, the temperature of the power supply switch 20 decreases. When the temperature of the power supply switch 20 decreases, the temperature of the switch circuit board Bs decreases. When the temperature of the switch circuit board Bs decreases, the output voltage of the temperature detection circuit 24 decreases.

After forcibly reducing its output voltage to 0 V, the latch circuit 22 fixes the output voltage to 0 V (predetermined voltage), until the output voltage of the microcomputer 25 switches to 0 V. Therefore, the driving circuit 21 keeps the power supply switch 20 off in a period from when the latch circuit 22 has forcibly reduced the output voltage to 0 V until when the output voltage of the microcomputer 25 is switched to 0 V. Since the output threshold voltage is larger than 0 V as mentioned above, an output voltage of 0 V of the latch circuit 22 is the voltage to instruct to switch the power supply switch 20 off.

As described above, with the power supply control device 12, the temperature of the switch circuit board Bs is prevented from increasing to an abnormal temperature. When the temperature of the switch circuit board Bs increases to an abnormal temperature, the circuit elements disposed on the switch circuit board Bs may not operate properly.

Note that the configuration of the temperature detection circuit 24 needs only be such that its output voltage increases when the temperature of the switch circuit board Bs increases. Therefore, the configuration of the temperature detection circuit 24 is not limited to a configuration in which the thermistor 30 and the detection resistor 31 are used. A detection resistor may be used in place of the thermistor 30, and a PTC (positive temperature coefficient) thermistor may be used in place of the detection resistor 31, for example. The resistance of a PTC thermistor increases as the temperature of the PTC thermistor increases.

Configuration of Latch Circuit 22

Figure 3:
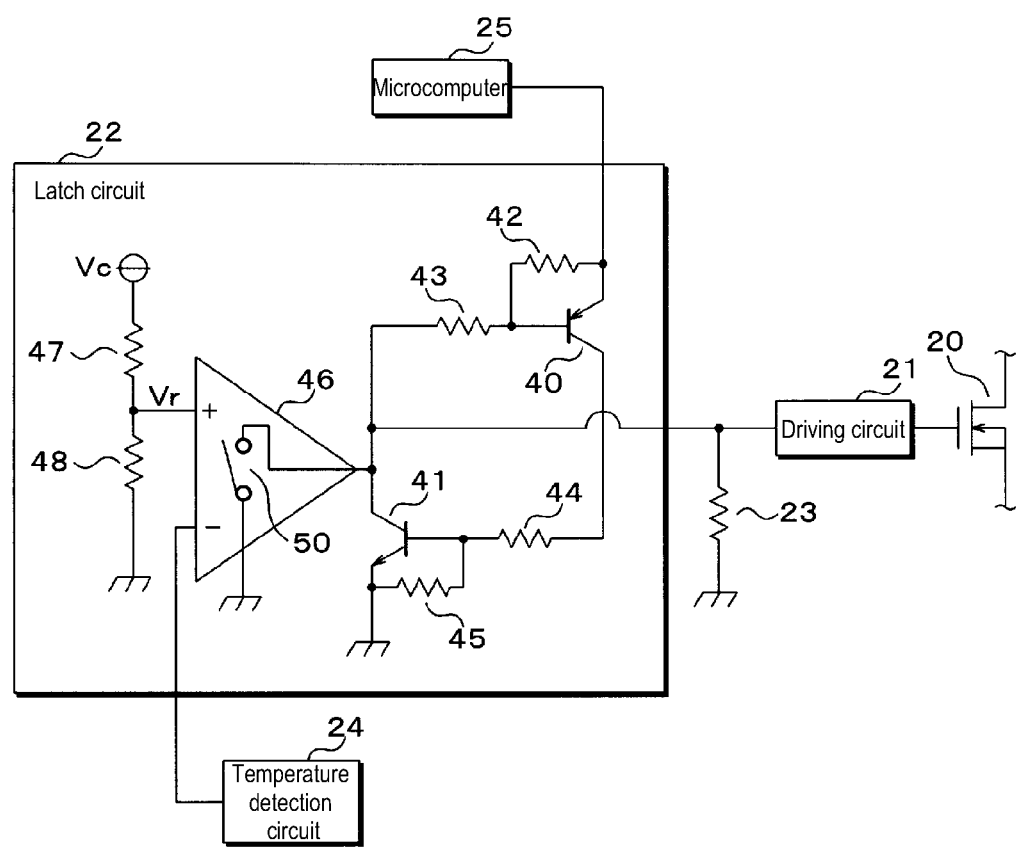
FIG. 3 is a circuit diagram of a latch circuit.

FIG. 3 is a circuit diagram of the latch circuit 22. The latch circuit 22 includes a first switch 40, a second switch 41, a first resistor 42, a second resistor 43, a third resistor 44, a fourth resistor 45, a comparator 46, a first voltage-dividing resistor 47, and a second voltage-dividing resistor 48. The first switch 40 is a PNP bipolar transistor. The second switch 41 is an NPN bipolar transistor. The comparator 46 has a plus terminal and a minus terminal. The first switch 40 and the second switch 41 each have a collector, an emitter, and a base.

The emitter of the first switch 40 is connected to the microcomputer 25. The first resistor 42 is connected between the base and emitter of the first switch 40. One end of the second resistor 43 is also connected to the base of the first switch 40. The other end of the second resistor 43 is connected to the collector of the second switch 41. The third resistor 44 is connected between the collector of the first switch 40 and the base of the second switch 41. The fourth resistor is connected between the base and emitter of the second switch 41. The emitter of the second switch 41 is grounded. The collector of the second switch 41 is connected to the input end of the driving circuit 21 and the one end of the device resistor 23.

In the latch circuit 22, the output voltage of the microcomputer 25 is input to the emitter of the first switch 40. The output voltage of the latch circuit 22 is output from the collector of the second switch 41 to the driving circuit 21.

The comparator 46 includes a comparator switch 50. One end of the comparator switch 50 is connected to the collector of the second switch 41. The other end of the comparator switch 50 is grounded. One end of the first voltage-dividing resistor 47 is connected to one end of the second voltage-dividing resistor 48. The fixed voltage Vc is applied to the other end of the first voltage-dividing resistor 47. The other end of the second voltage-dividing resistor 48 is grounded. The connection node between the first voltage-dividing resistor 47 and the second voltage-dividing resistor 48 is connected to the plus terminal of the comparator 46. The minus terminal of the comparator 46 is connected to the temperature detection circuit 24.

If a current flows from the microcomputer 25 through the first resistor 42 and the second resistor 43 in that order, when the voltage between the emitter and base of the first switch 40 has increased to a fixed threshold voltage or more, the first switch 40 is switched from off to on. The threshold voltage is larger than 0 V. When the first switch 40 is on, the resistance between the emitter and collector of the first switch 40 is sufficiently small, and a current can flow through the emitter and collector.

In a similar case, when the voltage between the emitter and base of the first switch 40 has decreased below the threshold voltage, the first switch 40 is switched from on to off. When the first switch 40 is off, the resistance between the emitter and collector of the first switch 40 is sufficiently large, and no current will flow through the emitter and collector.

If a current flows from the microcomputer 25 through the first switch 40, the third resistor 44, and the fourth resistor 45 in that order, when the voltage between the emitter and base of the second switch 41 has increased to a fixed second threshold voltage or more, the second switch 41 is switched from off to on. The second threshold voltage is larger than 0 V. When the second switch 41 is on, the resistance between the emitter and collector of the second switch 41 is sufficiently small, and a current can flow through the collector and emitter.

In a similar case, when the voltage between the emitter and base of the second switch 41 has decreased below the second threshold voltage, the second switch 41 is switched from on to off. When the second switch 41 is off, the resistance between the emitter and collector of the second switch 41 is sufficiently large, and no current will flow through the collector and emitter.

The first voltage-dividing resistor 47 and second voltage-dividing resistor 48 divide the fixed voltage Vc, and output the divided voltage to the plus terminal of the comparator 46 as a reference voltage Vr. The reference voltage Vr is determined by the resistance ratio between the first voltage-dividing resistor 47 and second voltage-dividing resistor 48. The resistances of the first voltage-dividing resistor 47 and second voltage-dividing resistor 48 are fixed values, and therefore the reference voltage Vr is a fixed voltage. The reference voltage Vr is smaller than the fixed voltage Vc. The temperature detection circuit 24 outputs the output voltage to the minus terminal of the comparator 46.

When the output voltage of the temperature detection circuit 24 has increased to the reference voltage Vr or more, the comparator 46 switches the comparator switch 50 on. When the output voltage of the temperature detection circuit 24 has decreased below the reference voltage Vr, the comparator 46 switches the comparator switch 50 off.

An NPN bipolar transistor or an N-channel FET may be used as the comparator switch 50, for example. If an NPN bipolar transistor is used as the comparator switch 50, the collector of the comparator switch 50 is connected to the collector of the second switch 41. The emitter of the comparator switch 50 is grounded. If an N-channel FET is used as the comparator switch 50, the drain of the comparator switch 50 is connected to the collector of the second switch 41. The source of the comparator switch 50 is grounded.

Operation of Latch Circuit 22

Figure 4:
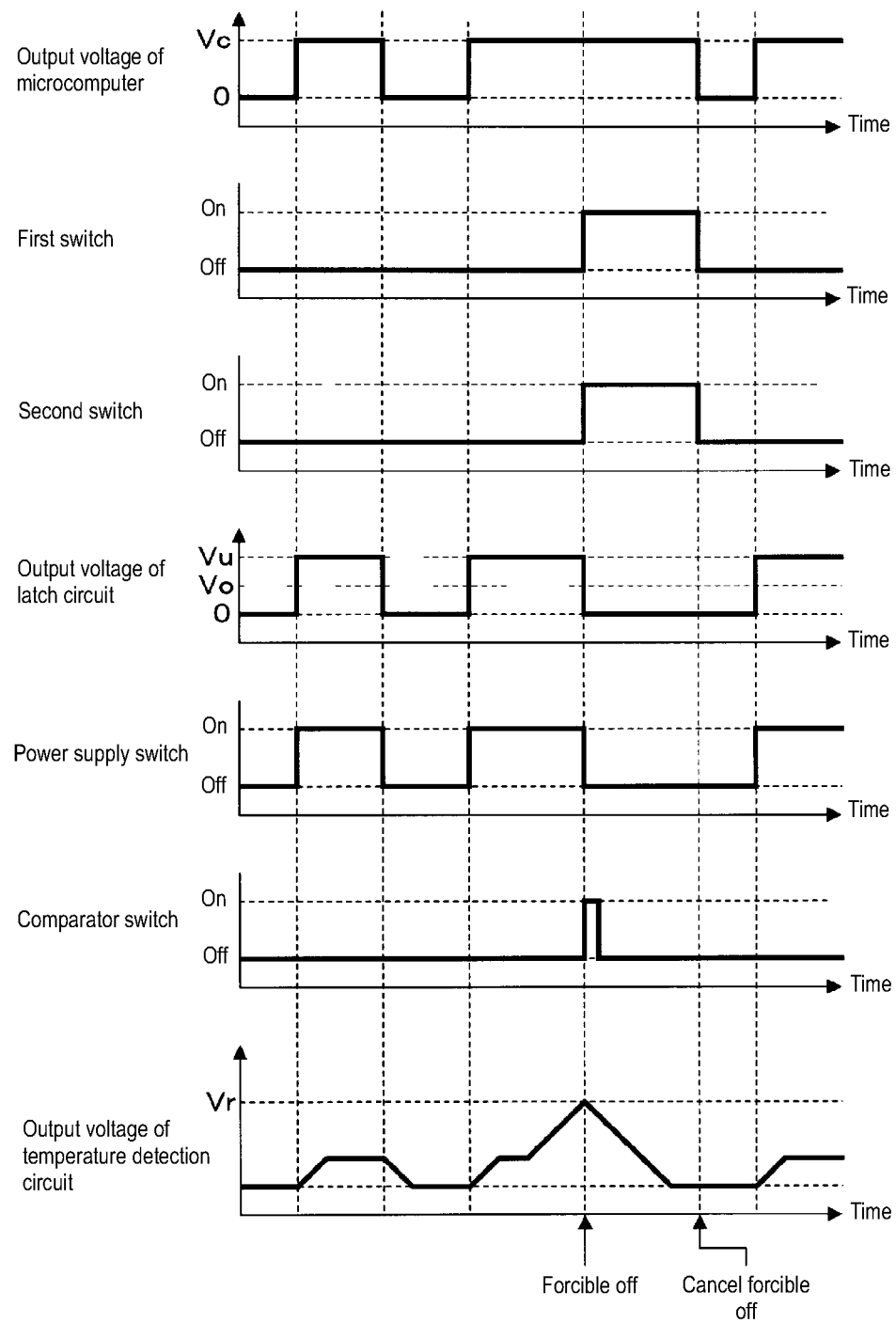
FIG. 4 is a timing chart illustrating the operation of the latch circuit.

FIG. 4 is a timing chart illustrating the operation of the latch circuit 22. In FIG. 4, changes in the output voltages of the microcomputer 25, latch circuit 22, and temperature detection circuit 24 are shown. In FIG. 4, changes in the state of the first switch 40, second switch 41, power supply switch 20, and comparator switch 50 are also shown. On and off of the switches are shown as the states thereof. The horizontal axes of seven charts in FIG. 4 show time. Vo indicates the output threshold. Vr indicates the reference voltage.

When the output voltage of the microcomputer 25 is 0 V, no current will flow through the first resistor 42. Therefore, there is no voltage drop at the first resistor 42. As a result, the voltage between the emitter and base of the first switch 40 is 0 V, and is less than the threshold voltage. The first switch 40 is off. When the first switch 40 is off, no current will flow through the fourth resistor 45. Therefore, there is no voltage drop at the fourth resistor 45. As a result, the voltage between the base and emitter of the second switch 41 is 0 V, and is less than the second threshold voltage. The second switch 41 is thus also off.

When the output voltage of the microcomputer 25 is 0 V, the output voltage of the latch circuit 22 is 0 V, and is less than the output threshold voltage Vo. Therefore, the driving circuit 21 keeps the power supply switch 20 off. When the output voltage of the temperature detection circuit 24 is less than the reference voltage Vr, the comparator 46 keeps the comparator switch 50 off.

When the microcomputer 25 switches the output voltage from 0 V to the fixed voltage Vc, in a state in which the first switch 40, second switch 41, and comparator switch 50 are off, a current flows from the microcomputer 25.

Figure 5:
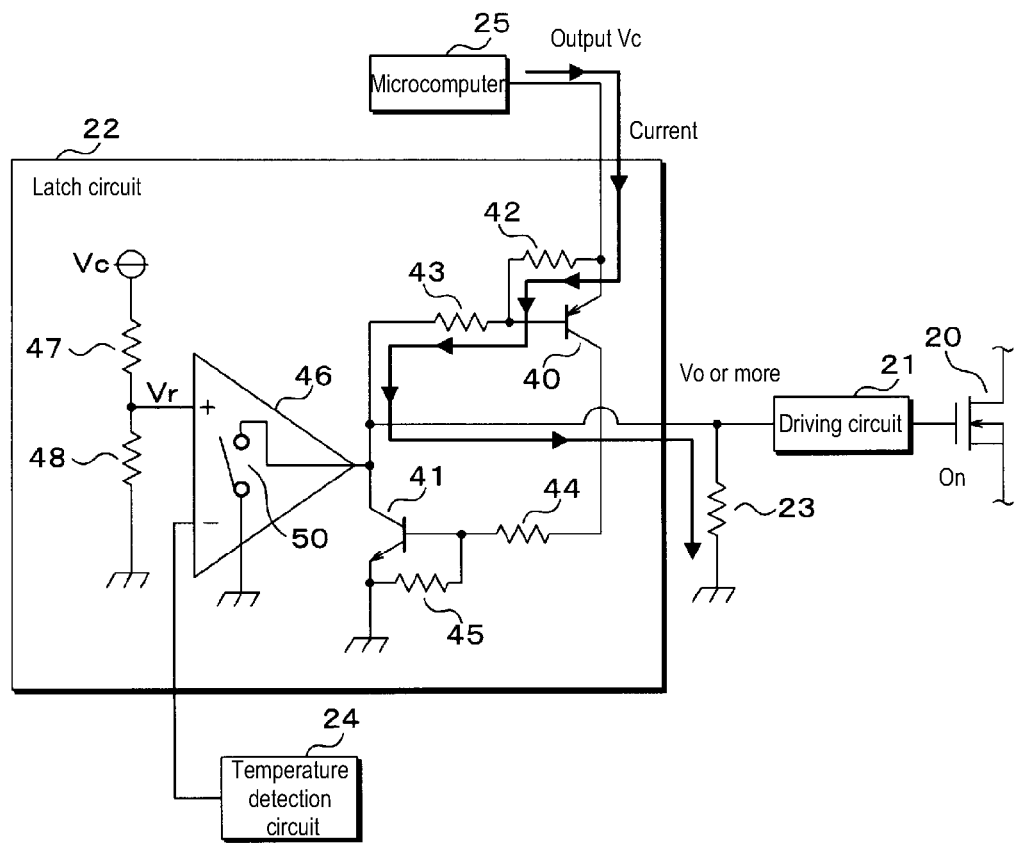
FIG. 5 is a diagram illustrating a current flow when a microcomputer switches an output voltage to a fixed voltage.

FIG. 5 is a diagram illustrating a current flow when the microcomputer 25 switches the output voltage to the fixed voltage Vc. When the microcomputer 25 switches the output voltage from 0 V to the fixed voltage Vc, a current flows from the microcomputer 25 through the first resistor 42, the second resistor 43, and the device resistor 23 in that order, as shown in FIG. 5. Therefore, there is a voltage drop at the first resistor 42. The voltage across the first resistor 42 is proportional to the current flowing through the first resistor 42.

The sum of resistances of the first resistor 42, second resistor 43, and device resistor 23 is sufficiently large. As a result, the current flowing through the first resistor 42 is very small. Therefore, the voltage across the first resistor 42, that is the voltage between the emitter and base of the first switch 40 is less than the threshold voltage. The first switch 40 is off.

When a current flows through the first resistor 42, second resistor 43, and device resistor 23 in that order, a resistor circuit constituted by the first resistor 42 and second resistor 43, and the device resistor 23 divides the fixed voltage Vc. The divided voltage is output to the driving circuit 21 as the output voltage of the latch circuit 22. Here, the output voltage of the latch circuit 22 is determined by the ratio between the sum of resistances of the first resistor 42 and second resistor 43, and the resistance of the device resistor 23. The resistance of the device resistor 23 is sufficiently larger than the sum of resistances of the first resistor 42 and second resistor 43. Therefore, a circuit voltage Vu close to the fixed voltage Vc is output to the driving circuit 21, as the output voltage of the latch circuit 22.

The circuit voltage Vu is equal to or larger than the output threshold voltage Vo. Therefore, when the output voltage of the latch circuit 22 increases from 0 V to the circuit voltage Vu, the driving circuit 21 switches the power supply switch 20 on. Accordingly, a current flows through the power supply switch 20, and the power supply switch 20 generates heat. In a period from when a current starts flowing through the power supply switch 20 until when the heat generation amount of the power supply switch 20 becomes equal to the heat dissipation amount thereof, the temperature of the power supply switch 20 increases. When the temperature of the power supply switch 20 increases, the temperature of the switch circuit board Bs increases. When the temperature of the switch circuit board Bs increases, the output voltage of the temperature detection circuit 24 increases, as shown in FIG. 4.

When the microcomputer 25 keeps the output voltage to the fixed voltage Vc, when the power supply system 1 is in a normal state, the temperature of the power supply switch 20 stabilizes at a low temperature. As a result, the output voltage of the temperature detection circuit 24 is less than the reference voltage Vr. The comparator switch 50 is kept off.

When the microcomputer 25 reduces the output voltage from the fixed voltage Vc to 0 V, the current flow through the first resistor 42, second resistor 43, and device resistor 23 stops. Accordingly, the voltage across the first resistor 42 decreases to 0 V. Therefore, the voltage between the emitter and base of the first switch 40 decreases to 0 V, and the first switch 40 is kept off. When the first switch 40 is off, the second switch 41 is off, as mentioned above.

As shown in FIG. 4, when the output voltage of the microcomputer 25 has decreased from the fixed voltage Vc to 0 V, the output voltage of the latch circuit 22 decreases from the circuit voltage Vu to 0 V. 0 V is less than the output threshold voltage Vo. When the output voltage of the latch circuit 22 has decreased below the output threshold voltage Vo, the driving circuit 21 switches the power supply switch 20 off. When the power supply switch 20 is off, heat generation in the power supply switch 20 stops. Accordingly, the temperature of the power supply switch 20 decreases. When the temperature of the power supply switch 20 decreases, the temperature of the switch circuit board Bs decreases. When the temperature of the switch circuit board Bs decreases, the output voltage of the temperature detection circuit 24 decreases. When the temperature of the switch circuit board Bs stabilizes, the output voltage of the temperature detection circuit 24 stabilizes. The comparator switch 50 is kept off.

As described above, in the latch circuit 22, when the first switch 40, second switch 41, and comparator switch 50 are off, the output voltage of the microcomputer 25 is output to the driving circuit 21 via the first resistor 42 and second resistor 43. The latch circuit 22 outputs a voltage according to the output voltage of the microcomputer 25. When the microcomputer 25 increases its output voltage from 0 V to the fixed voltage Vc, the driving circuit 21 switches the power supply switch 20 from off to on. When the microcomputer 25 has decreased the output voltage from the fixed voltage Vc to 0 V, the driving circuit 21 switches the power supply switch 20 from on to off. While the power supply system 1 is in a normal state, the first switch 40 and second switch 41 are kept off.

When the output voltage of the microcomputer 25 is the fixed voltage Vc, in a state in which the first switch 40 and second switch 41 are off, the output voltage of the latch circuit 22 is the circuit voltage Vu, and the power supply switch 20 is on, as mentioned above. When the power supply system 1 is in a normal state, when the power supply switch 20 is on, the output voltage of the temperature detection circuit 24 stabilizes at a voltage less than the reference voltage Vr.

For example, when both ends of the load 11 are short-circuited, the state of the power supply system 1 transitions to an abnormal state. In this case, a large current flows through the power supply switch 20, and the heat generation amount of the power supply switch 20 increases considerably. Accordingly, the temperature of the switch circuit board Bs increases considerably. When the temperature of the switch circuit board Bs increases considerably, the output voltage of the temperature detection circuit 24 increases considerably as well.

When the output voltage of the temperature detection circuit 24 has increased to the reference voltage Vr or more, in a state in which the output voltage of the microcomputer 25 is the fixed voltage Vc, the comparator 46 switches the comparator switch 50 from off to on. In this case, a current flows through the comparator switch 50.

Figure 6:
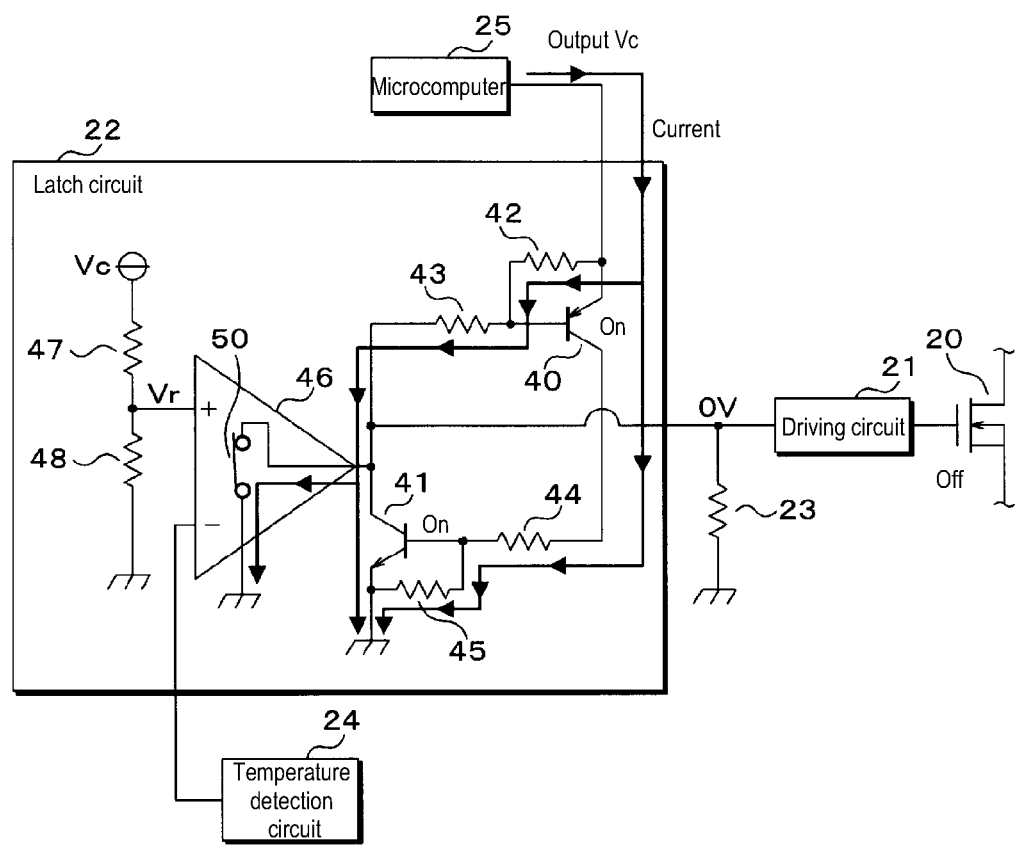

FIG. 6 is a diagram illustrating a current flow when the comparator switch 50 is on. When the comparator switch 50 is on, a current flows from the microcomputer 25 through the first resistor 42, second resistor 43, and comparator switch 50 in that order. Accordingly, there is a voltage drop at the first resistor 42.

No current flows through the device resistor 23. As a result, a large current flows through the second resistor 43. Therefore, when the comparator switch 50 is on, the voltage across the first resistor 42 is the threshold voltage or more. When the voltage across the first resistor 42 is the threshold voltage or more, the voltage between the emitter and base of the first switch 40 is the threshold voltage or more, and the first switch 40 is on. Therefore, when the comparator 46 switches the comparator switch 50 from off to on, the first switch 40 is switched from off to on.

When the first switch 40 is on, a current flows from the microcomputer 25 through the first switch 40, third resistor 44, and fourth resistor 45 in that order. Accordingly, there is a voltage drop at the fourth resistor 45. When the first switch 40 is switched on, the voltage between the base and emitter of the second switch 41 increases to the second threshold voltage or more. When the voltage between the base and emitter of the second switch 41 has increased to the second threshold voltage or more, the second switch 41 is switched from off to on. When the second switch 41 is switched from off to on, a current flows from the microcomputer 25 through the first resistor 42, second resistor 43, and second switch 41 in that order.

When the comparator switch 50 is on, a resistor current that flows through the first resistor 42 and second resistor 43 in that order is input to the comparator switch 50. The comparator switch 50 functions as a third switch. The comparator 46 functions as a second switching circuit. When the first switch 40 is on, a current is input to the emitter of the first switch 40 from the microcomputer 25, and a current is output from the collector of the first switch 40 to the third resistor 44. The emitter, collector, and base of the first switch 40 respectively function as an input end, an output end, and a control end. When the second switch 41 is on, a resistor current that flows through the first resistor 42 and second resistor 43 in that order is input to the collector of the second switch 41, and a current is output from the emitter of the second switch 41. The collector, emitter, and base of the second switch 41 respectively function as a second input end, a second output end, and a second control end.

When the comparator switch 50 is switched from off to on, one end of the device resistor 23 on the driving circuit 21 side is grounded. Accordingly, the output voltage of the latch circuit 22 decreases from the circuit voltage Vu to 0 V. As a result, the driving circuit 21 forcibly switches the power supply switch 20 from on to off. When the power supply switch 20 is switched off, the power supply switch 20 stops generating heat, and therefore the temperature of the power supply switch 20 decreases. When the temperature of the power supply switch 20 decreases, the temperature of the switch circuit board Bs decreases. When the temperature of the switch circuit board Bs decreases, the output voltage of the temperature detection circuit 24 decreases below the reference voltage Vr. As a result, the comparator 46 switches the comparator switch 50 from on to off.

Figure 7:
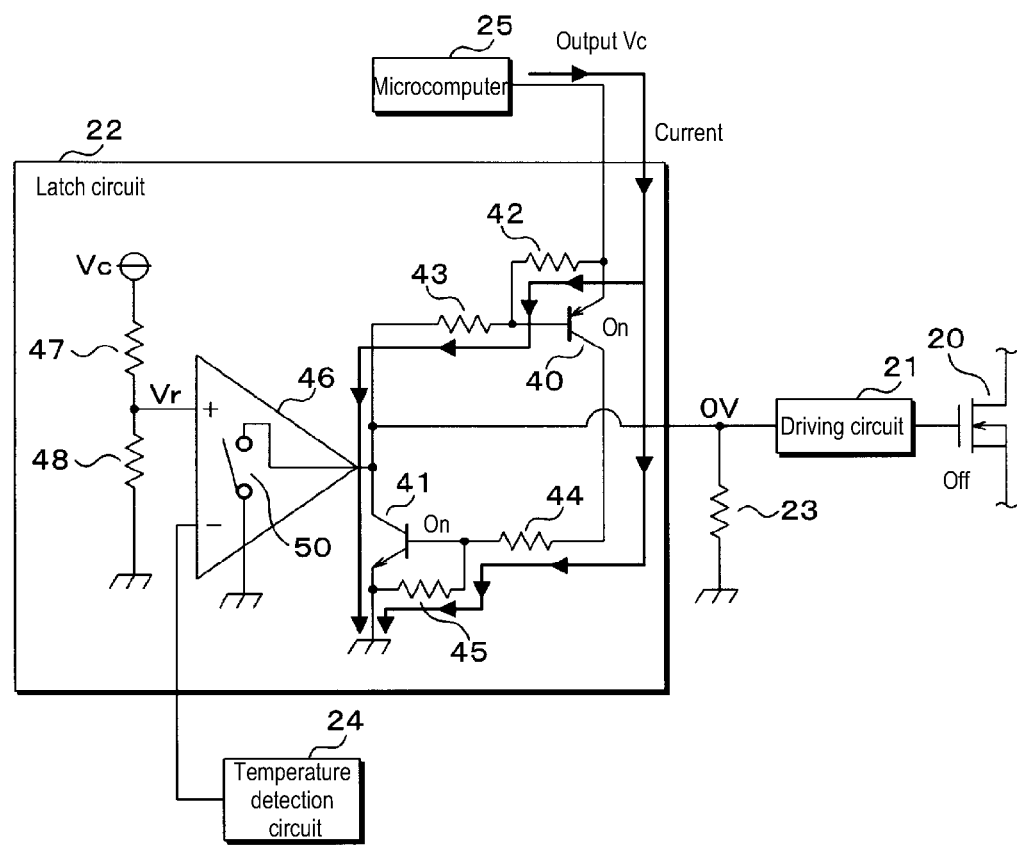
FIG. 7 is a diagram illustrating a current flow when the comparator switch is switched from on to off.

FIG. 7 is a diagram illustrating a current flow when the comparator switch 50 is switched from on to off. At a point in time at which the comparator switch 50 is switched off, the second switch 41 is on. When the second switch 41 is on, a current flows from the microcomputer 25 through the first resistor 42, second resistor 43, and second switch 41 in that order, as mentioned above. No current flows through the device resistor 23. Therefore, when the second switch 41 is on, the voltage across the first resistor 42 is the threshold voltage or more. As a result, the voltage between the emitter and base of the first switch 40 is kept to be the threshold voltage or more. The first switch 40 is kept on.

As mentioned above, when the first switch 40 is on, the second switch 41 is on. When the second switch 41 is on, the one end of the device resistor 23 at the driving circuit 21 is grounded. Therefore, the output voltage of the latch circuit 22 is fixed to 0 V. As a result, even if the comparator switch 50 is switched off, the driving circuit 21 keeps the power supply switch 20 off, as long as the output voltage of the microcomputer 25 is the fixed voltage Vc.

As described above, the latch circuit 22 outputs a voltage according to the output voltage of the microcomputer 25 until the comparator switch 50 is switched on. In the case where the output voltage of the microcomputer 25 is the fixed voltage Vc, when the comparator switch 50 is switched on, the latch circuit 22 reduces the output voltage from the circuit voltage Vu to 0 V (predetermined voltage). Thereafter, the latch circuit 22 fixes the output voltage to 0 V (predetermined voltage), irrespective of the state of the comparator switch 50. Switching the comparator switch 50 on corresponds to a predetermined condition.

When the power supply switch 20 has been switched off, the output voltage of the temperature detection circuit 24 decreases until the temperature of the switch circuit board Bs stabilizes, as mentioned above. When the microcomputer 25 has switched the output voltage from the fixed voltage Vc to 0 V, in a state in which the latch circuit 22 fixes the output voltage to 0 V, the current flow through the first resistor 42 and the current flow through the fourth resistor 45 stop.

When the current flow through the first resistor 42 has stopped, the voltage between the emitter and base of the first switch 40 decreases to 0 V, and the first switch 40 is switched off. When the current flow through the fourth resistor 45 has stopped, the voltage between the base and emitter of the second switch 41 decreases to 0 V, and the second switch 41 is switched off. When the first switch 40 and the second switch 41 have been switched off, the forcible off performed by the driving circuit 21 is canceled. When the first switch 40 and second switch 41 are off, the latch circuit 22 outputs a voltage according to the output voltage of the microcomputer 25, as mentioned above.

After the forcible off has been canceled, when the microcomputer 25 has switched the output voltage from 0 V to the fixed voltage Vc, the driving circuit 21 switches the power supply switch 20 from off to on.

Effects of Power Supply Control Device 12

In the latch circuit 22 of the power supply control device 12, the number of switches needed to fix the output voltage to 0 V is three, which is a small number.

Modifications

The temperature detection circuit 24 needs only be configured such that the output voltage thereof indicates the temperature of the switch circuit board Bs. Therefore, the configuration of the temperature detection circuit 24 is not limited to a configuration in which the output voltage increases, as the temperature of the switch circuit board Bs increases. The configuration of the temperature detection circuit 24 may be such that the output voltage decreases, as the temperature of the switch circuit board Bs increases. A detection resistor 31 and a thermistor 30 may be used in place of the thermistor 30 and the detection resistor 31, respectively, as a first example. A PTC thermistor may also be used as the thermistor 30, as a second example. In a configuration in which the output voltage decreases, as the temperature of the switch circuit board Bs increases, the output voltage of the temperature detection circuit 24 is output to the plus terminal of the comparator 46 of the latch circuit 22. The reference voltage Vr is output to the minus terminal of the comparator 46. The configuration of the temperature detection circuit 24 is not limited to a configuration in which a thermistor is used.

Embodiment 2

In the power supply control device 12 in Embodiment 1, the temperature of the switch circuit board Bs is prevented from increasing to an abnormal temperature. However, the object whose temperature is prevented from increasing to an abnormal temperature may also be an object different from the switch circuit board Bs.

The differences between Embodiment 2 and Embodiment 1 will be described below. Structural features other than those described below are the same as in Embodiment 1. Therefore, constituent units that are the same as in Embodiment 1 are given the same reference numerals as in Embodiment 1, and their further description will be omitted.

Configuration of Power Supply Control Device 12

Figure 8:
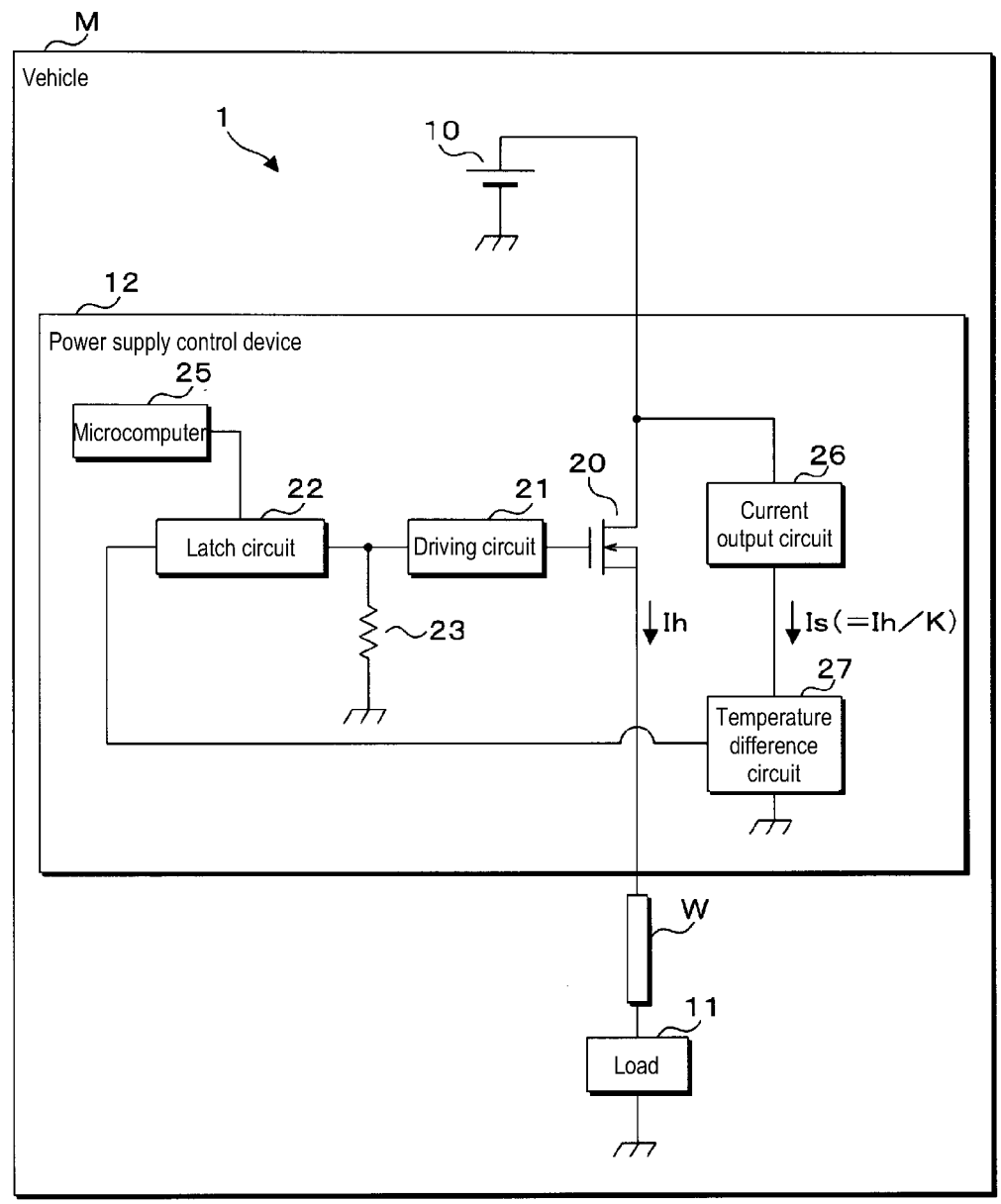
FIG. 8 is a block diagram illustrating the main configuration of a power supply system in Embodiment 2.

FIG. 8 is a block diagram illustrating the main configuration of a power supply system 1 in Embodiment 2. When the power supply system 1 in Embodiment 2 is compared with the power supply system 1 in Embodiment 1, the configuration of the power supply control device 12 differs. The power supply control device 12 in Embodiment 2 includes a power supply switch 20, a driving circuit 21, a latch circuit 22, a device resistor 23, and a microcomputer 25, similarly to Embodiment 1. The connection between these constituent units is similar to that in Embodiment 1.

The power supply control device 12 in Embodiment 2 includes a current output circuit 26 and a temperature difference circuit 27, in place of the temperature detection circuit 24. The current output circuit 26 is connected to a drain of the power supply switch 20 and the temperature difference circuit 27. The temperature difference circuit 27 is further connected to the latch circuit 22. The temperature difference circuit 27 is grounded. The current output circuit 26 and the temperature difference circuit 27 are disposed on a switch circuit board Bs.

As described in Embodiment 1, when the driving circuit 21 switches the power supply switch 20 on, a current flows from a positive electrode of a DC power supply 10 through the power supply switch 20, a wire W, and a load 11 in that order. Therefore, the wire W is disposed on a current path of current flowing through the power supply switch 20. The wire current flowing through the wire W is denoted as Ih. The wire current Ih is the same as the current flowing through the power supply switch 20. The current output circuit 26 draws in current from the drain of the power supply switch 20, and outputs the drawn-in current to the temperature difference circuit 27. The output current output from the current output circuit 26 is denoted as Is.

The current output circuit 26 adjusts the output current Is such that the following formula (1) is satisfied.

$$Is=Ih/K \qquad (1)$$

Here, K is a constant. The constant K is 4000, for example. As shown in formula (1), the output current Is of the current output circuit 26 increases as the wire current Ih increases.

The temperature difference circuit 27 outputs a voltage to a minus terminal of the comparator 46 of the latch circuit 22. A reference voltage Vr generated by dividing the fixed voltage Vc by a first voltage-dividing resistor 47 and a second voltage-dividing resistor 48 is input to a plus terminal of the comparator 46.

When the power supply switch 20 is switched on, a wire current Ih flows, as mentioned above. When the wire current Ih flows, the wire W generates heat. The heat generation amount of the wire W increases, as the power consumed in the wire W increases. The power consumed in the wire W is represented by the product of the square of the wire current Ih and the resistance of the wire W. When the heat generation amount of the wire W per unit time exceeds the heat dissipation amount thereof per unit time, the wire temperature of the wire W increases.

When the power supply switch 20 is switched off, the wire current Ih decreases to 0 A, and the wire temperature of the wire W decreases. The temperature difference circuit 27 adjusts the output voltage according to the temperature difference between the wire temperature of the wire W and an ambient temperature in the vicinity of the wire W.

Figure 9:
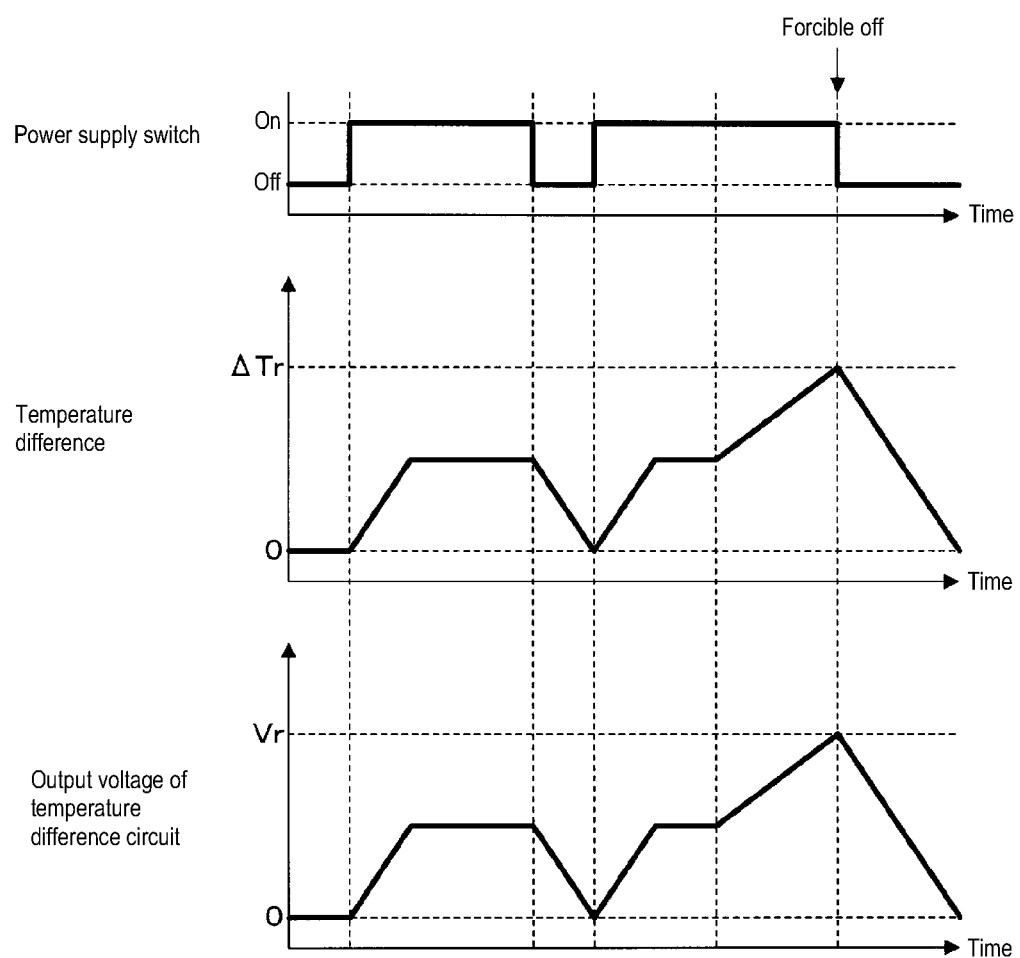
FIG. 9 is a timing chart illustrating the operation of a temperature difference circuit.

FIG. 9 is a timing chart illustrating the operation of the temperature difference circuit 27. In FIG. 9, a change in the state of the power supply switch 20, a change in the temperature difference regarding the wire W, and a change in the output voltage of the temperature difference circuit 27 are shown. The horizontal axes of these charts show time.

The output voltage of the temperature difference circuit 27 is generated based on the output current of the current output circuit 26. In the case where the power supply switch 20 is off, when the temperature difference regarding the wire W is zero degrees, the output voltage of the temperature difference circuit 27 is 0 V. The temperature difference being zero degrees indicates that the wire temperature is the same as the ambient temperature in the vicinity of the wire W. When the driving circuit 21 switches the power supply switch 20 on, a wire current Ih flows, and the temperature difference regarding the wire W increases. When the temperature difference increases, the output voltage of the temperature difference circuit 27 also increases.

When the power supply system 1 is in a normal state, the heat generation amount of the wire W is the same as the heat dissipation amount thereof, and the temperature difference regarding the wire W stabilizes. When the temperature difference stabilizes, the output voltage of the temperature difference circuit 27 stabilizes. When the driving circuit 21 switches the power supply switch 20 off, the temperature difference regarding the wire W decreases, as mentioned above. When the temperature difference regarding the wire W decreases, the output voltage of the temperature difference circuit 27 also decreases.

As described above, the output voltage of the temperature difference circuit 27 increases, as the temperature difference regarding the wire W increases. When the temperature difference regarding the wire W reaches a fixed reference temperature difference ΔTr, the output voltage of the temperature difference circuit 27 reaches the reference voltage Vr.

When the output voltage of the temperature difference circuit 27 is less than the reference voltage Vr, the latch circuit 22 adjusts the output voltage according to the output voltages of the microcomputer 25 and temperature difference circuit 27. The driving circuit 21 switches the power supply switch 20 on or off according to the output voltage of the latch circuit 22. When the output voltage of the temperature difference circuit 27 has increased to the reference voltage Vr or more, the driving circuit 21 forcibly switches the power supply switch 20 from on to off, as described below. Accordingly, the wire current Ih decreases to 0 A, and the wire temperature decreases.

As mentioned above, the output voltage of the temperature difference circuit 27 being less than the reference voltage Vr indicates that the temperature difference regarding the wire W is less than the reference temperature difference ΔTr. The output voltage of the temperature difference circuit 27 being the reference voltage Vr or more indicates that the temperature difference regarding the wire W is the reference temperature difference ΔTr or more. Therefore, when the temperature difference regarding the wire W is less than the reference temperature difference ΔTr, the comparator 46 keeps the comparator switch 50 off. When the temperature difference regarding the wire W has increased to the reference temperature difference ΔTr or more, the comparator 46 switches the comparator switch 50 from off to on. When the temperature difference regarding the wire W has decreased below the reference temperature difference ΔTr, the comparator 46 switches the comparator switch 50 from on to off. The reference temperature difference ΔTr corresponds to a predetermined temperature difference.

Operation of Latch Circuit 22

Figure 10:
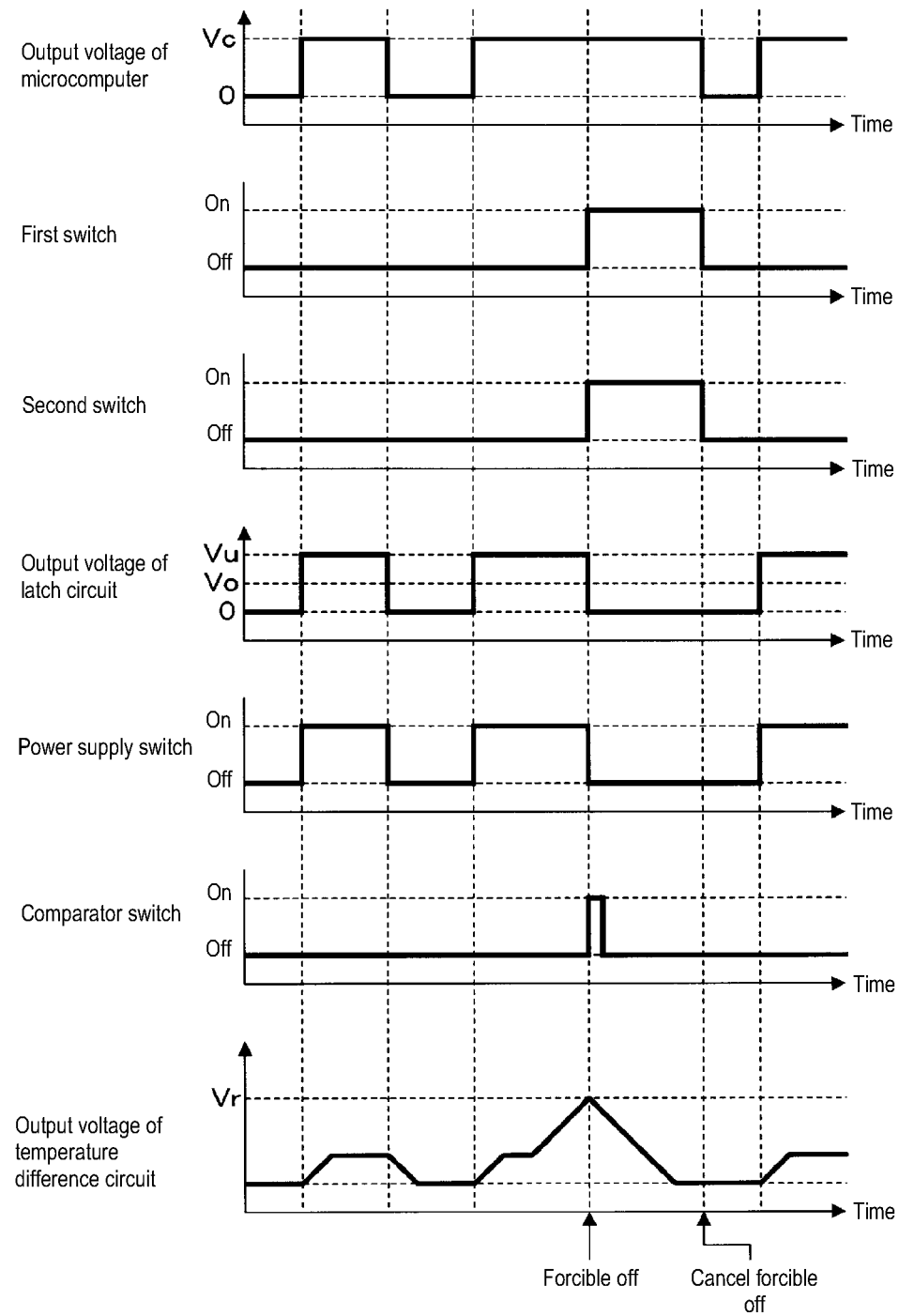
FIG. 10 is a timing chart illustrating the operation of a latch circuit.

FIG. 10 is a timing chart illustrating the operation of the latch circuit 22. Changes in output voltages of the microcomputer 25, latch circuit 22, and temperature difference circuit 27 are shown in FIG. 10. Also, changes in the state of the first switch 40, second switch 41, power supply switch 20, and comparator switch 50 are shown in FIG. 10. On and off states of the switches are shown as the states thereof. The horizontal axes of seven charts in FIG. 10 show time. As described above in Embodiment 1, Vu and Vo respectively indicate the circuit voltage and the output threshold voltage.

The operation of the latch circuit 22 in Embodiment 2 is similar to the operation of the latch circuit 22 in Embodiment 1. The operation of the latch circuit 22 in Embodiment 2 can be described by replacing the temperature detection circuit 24 with the temperature difference circuit 27 in the description of the operation of the latch circuit 22 in Embodiment 1.

When the output voltage of the temperature difference circuit 27 is less than the reference voltage Vr, the comparator switch 50 is off. When the first switch 40, second switch 41, and comparator switch 50 are off, the latch circuit 22 outputs a voltage according to the output voltage of the microcomputer 25 to the driving circuit 21. When the output voltage of the microcomputer 25 is 0 V, the output voltage of the latch circuit 22 is 0 V. When the output voltage of the latch circuit 22 is 0 V, the driving circuit 21 keeps the power supply switch 20 off.

When the microcomputer 25 has switched the output voltage from 0 V to the fixed voltage Vc, the output voltage of the latch circuit 22 increases from 0 V to the circuit voltage Vu, and the driving circuit 21 switches the power supply switch 20 from off to on. When the microcomputer 25 has switched the output voltage from the fixed voltage Vc to 0 V, the output voltage of the latch circuit 22 decreases from the circuit voltage Vu to 0 V, and the driving circuit 21 switches the power supply switch 20 from on to off.

In the case where the output voltage of the microcomputer 25 is the fixed voltage Vc, when the output voltage of the temperature difference circuit 27 has increased to the reference voltage Vr or more, the comparator 46 switches the comparator switch 50 off to on. Accordingly, the output voltage of the latch circuit 22 decreases from the fixed voltage Vc to 0 V, and the driving circuit 21 switches the power supply switch 20 from on to off. The reference voltage Vr corresponds to a predetermined voltage.

When the comparator 46 has switched the comparator switch 50 from off to on, the first switch 40 and second switch 41 are switched from off to on. When the power supply switch 20 is switched off, the wire current Ih decreases to [[0 V]] 0 A, and the wire temperature decreases. When the wire temperature decreases, the output voltage of the temperature difference circuit 27 decreases below the reference voltage Vr. Accordingly, the comparator 46 switches the comparator switch 50 from on to off.

At the point in time at which the comparator 46 switches the comparator switch 50 off, the first switch 40 and second switch 41 are on, and therefore the latch circuit 22 fixes the output voltage to 0 V (predetermined voltage), unless the output voltage of the microcomputer 25 decreases from the fixed voltage Vc to 0 V. When the output voltage of the latch circuit 22 is 0 V, the driving circuit 21 keeps the power supply switch 20 off, as mentioned above. When the microcomputer 25 has switched the output voltage from the fixed voltage Vc to 0 V, the first switch 40 and second switch 41 are switched from on to off, and the forcible off performed by the driving circuit 21 is canceled.

Effects of Power Supply Control Device 12

In the power supply control device 12 in Embodiment 2, when the temperature difference regarding the wire W has increased to the reference temperature difference ΔTr or more, the output voltage of the temperature difference circuit 27 increases to the reference voltage Vr or more. Therefore, when the temperature difference regarding the wire W has increased to the reference temperature difference ΔTr or more, the comparator switch 50 is switched on, and the output voltage of the latch circuit 22 is fixed to 0 V (predetermined voltage). As a result, the power supply switch 20 is kept off. The wire temperature of the wire W can be prevented from increasing to an abnormal temperature. When the wire temperature of the wire W increases to an abnormal temperature, the performance of the wire W may be degraded.

The power supply control device 12 in Embodiment 2 similarly achieves the effects achieved by the power supply control device 12 in Embodiment 1, other than the effects obtained by using the temperature detection circuit 24.

Note that, in Embodiment 2, the driving circuit 21 may have a function of switching the power supply switch 20 off according to the temperature of the power supply switch 20. In this configuration, a temperature detector, which is not illustrated, detects the temperature of the power supply switch 20. When the temperature of the power supply switch 20 detected by the temperature detector has increased to a fixed temperature or more, the driving circuit 21 switches the power supply switch 20 off, irrespective of the output voltage of the latch circuit 22. With this configuration, the temperature of the switch circuit board Bs can be prevented from increasing to an abnormal temperature.

Configuration of Temperature Difference Circuit 27

The configuration of the temperature difference circuit 27 is not a known configuration. Therefore, the configuration of the temperature difference circuit 27 will be described in detail below. The temperature difference circuit 27 is a circuit in which a current flows (is conducted) similarly to the heat in a thermal circuit of the wire W. Therefore, first, the thermal circuit of the wire W will be described.

Figure 11:
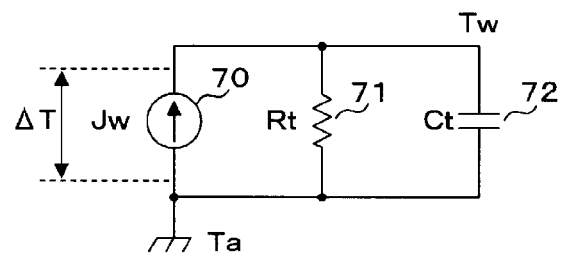
FIG. 11 is a thermal circuit diagram of a wire.
Figure 11:
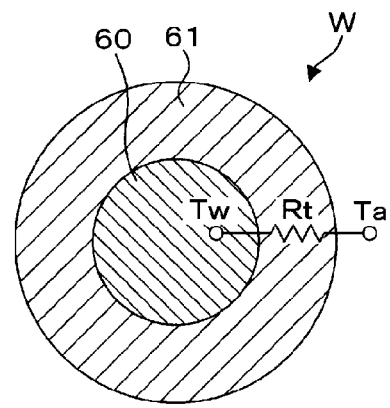

FIG. 11 is a thermal circuit diagram of the wire W. A cross section of the wire W is shown in a lower portion in FIG. 11. As shown in the lower portion in FIG. 11, in the wire W, an outer face of a bar-shaped conductor 60 through which a current flows is covered by an insulator 61. The thermal circuit shown in the upper portion in FIG. 11 is a thermal circuit when the wire W includes a conductor 60 and an insulator 61. The wire current Ih flows through the conductor 60. When the wire current Ih flows, heat is generated in the conductor 60.

The thermal circuit of the wire W includes a heat source 70, a thermal resistor 71, and a thermal capacitor 72. The thermal resistor 71 and thermal capacitor 72 are connected in parallel to the heat source 70. The heat source 70 outputs heat to one end of each of the thermal resistor 71 and thermal capacitor 72. The temperature of the one end of each of the thermal resistor 71 and thermal capacitor 72 is the wire temperature of the wire W. The temperature of the other end of each of the thermal resistor 71 and thermal capacitor 72 is an ambient temperature in the vicinity of the wire W.

Some of the heat generated in the heat source 70 is discharged to the outside of the wire W through the thermal resistor 71. The remaining heat generated in the heat source 70 is stored in the thermal capacitor 72. The heat stored in the thermal capacitor 72 is discharged to the outside of the wire W through the thermal resistor 71. The difference across the heat source 70 corresponds to the temperature difference between the wire temperature and the ambient temperature. In the example in FIG. 11, the thermal resistor 71 is the thermal resistance of the insulator 61.

The amount of heat output by the heat source 70 is denoted as Jw. The resistance of the thermal resistor 71 is denoted as Rt. The capacitance of the thermal capacitor 72 is denoted as Ct. The wire temperature, the ambient temperature, and the temperature difference are respectively denoted as Tw, Ta, and ΔT. The resistance of the wire W is denoted as Rw.

When heat is generated in the wire W, the temperature difference ΔT is represented by the following Formula (2).

$$\Delta T = Jw \cdot Rt \cdot \{1 - \exp(-t/(Ct \cdot Rt))\} \quad (2)$$

Here, t is a period in which the wire W generates heat, that is a current conduction period in which a current flows through the wire W. "·" indicates multiplication. Also, the amount of heat Jw is represented by the following Formula (3).

$$Jw = Ih^2 \cdot Rw \quad (3)$$

The amount of heat Jw depends on the wire current Ih.

The reference temperature difference is denoted as ΔTr, as mentioned above. The wire current Ih when the temperature difference ΔT is the reference temperature difference ΔTr is denoted as If.

The wire current If is represented by the following Formula (4) using Formulas (2) and (3).

[Math. 1]

$$If = \frac{\sqrt{\Delta Tr}}{\sqrt{Rw \cdot Rt}} \cdot \frac{1}{\sqrt{1 - \exp\left(-\frac{1}{Ct \cdot Rt}\right)}} \quad (4)$$

Figure 12:
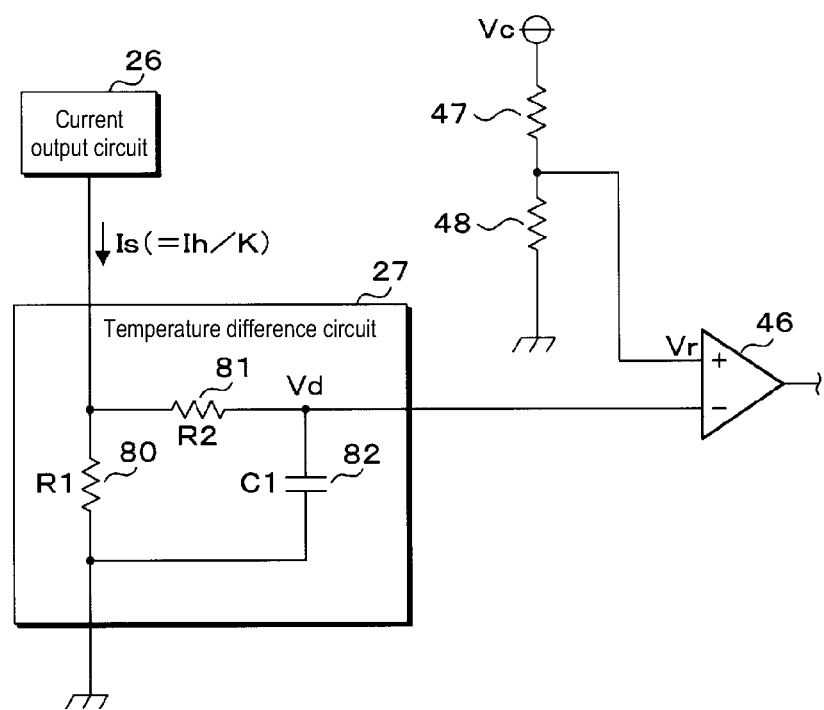
FIG. 12 is a circuit diagram of the temperature difference circuit.

FIG. 12 is a circuit diagram of the temperature difference circuit 27. The temperature difference circuit 27 includes a first circuit resistor 80, a second circuit resistor 81, and a capacitor 82. One end of the first circuit resistor 80 is connected to the current output circuit 26. The other end of the first circuit resistor 80 is grounded. The one end of the first circuit resistor 80 is connected to one end of the second circuit resistor 81. The other end of the second circuit resistor 81 is connected to one end of the capacitor 82. The other end of the capacitor 82 is grounded. The one end of the capacitor 82 is connected to the minus terminal of the comparator 46 of the latch circuit 22.

Some of the output current of the current output circuit 26 flows through the first circuit resistor 80. The remaining output current of the current output circuit 26 flows in the capacitor 82 through the second circuit resistor 81. Accordingly, power is stored in the capacitor 82. When power is stored in the capacitor 82, a current flows from the one end of the capacitor 82 to the second circuit resistor 81 and first circuit resistor 80 in that order, and the capacitor 82 discharges.

As described above, the current flow in the temperature difference circuit 27 is similar to the heat conduction in the thermal circuit of the wire W. The temperature difference circuit 27 corresponds to the thermal circuit shown in the upper portion in FIG. 11.

The voltage across the capacitor 82 is output to the minus terminal of the comparator 46 as an output voltage of the temperature difference circuit 27. The comparator 46 switches the comparator switch 50 on or off based on the result of comparison between the output voltage of the temperature difference circuit 27 and the reference voltage Vr, as mentioned above.

The voltage across the capacitor 82 (output voltage of the temperature difference circuit 27) is denoted as Vd. The resistances of the first circuit resistor 80 and second circuit resistor 81 are respectively denoted as R1 and R2. The capacitance of the capacitor 82 is denoted as C1. When a wire current flows through the wire W, that is, when the wire W is generating heat, the voltage Vd across the capacitor 82 is represented by the following Formula (5). Here, t is the aforementioned current conduction period.

[Math. 2]

$$Vd = \frac{Ih \cdot R1}{K} \cdot \left\{1 - \exp\left(-\frac{t}{C1 \cdot (R1 + R2)}\right)\right\} \quad (5)$$

In Formula (5), K is a constant, as described in Embodiment 1. The wire current Ih when the voltage Vd across the capacitor 82 is the reference voltage Vr is denoted as Ir. The wire current Ir is represented by the following Formula (6).

[Math. 3]

$$Ir = \frac{K \cdot Vr}{R1} \cdot \frac{1}{1 - \exp\left(-\frac{1}{C1 \cdot (R1 + R2)}\right)} \quad (6)$$

The method of determining the constant will be described next. The resistance Rw of the wire W and the capacitance Ct of the thermal capacitor 72 that depend on the structure of the wire W are determined in advance. The reference temperature difference ΔTr is set such that, even if the ambient temperature in the vicinity of the wire W is the maximal temperature, the wire W will not emit smoke at this temperature difference. For example, assume that the maximal temperature of the ambient temperature is 80 degrees. In a configuration in which the wire W is caused to stop generating heat when the wire temperature reaches 100 degrees, the reference temperature difference ΔTr is set to 20 degrees.

The constant K, reference voltage Vr, resistances R1 and R2, and capacitance C1 are determined based on Formulas (4) and (6) such that, with respect to any current conduction period t, the wire current Ir is substantially the same as the wire current If. Specifically, with respect to any current conduction period t, the constant K, reference voltage Vr, resistances R1 and R2, and capacitance C1 are determined such that the following Formulas (7) and (8) are substantially satisfied.

[Math. 4]

$$\frac{\sqrt{\Delta Tr}}{\sqrt{Rw \cdot Rt}} = \frac{K \cdot Vr}{R1} \quad (7)$$

$$\sqrt{1 - \exp\left(-\frac{t}{Ct \cdot Rt}\right)} = 1 - \exp\left(-\frac{t}{C1 \cdot (R1 + R2)}\right) \quad (8)$$

Note that a square root is used in the left side of Formula (8). The square root is not used in the right side of Formula (8). Therefore, it is impossible to determine the resistances R1 and R2 and capacitance C1 that satisfy Formula (8) throughout the entire current conduction period t. Therefore, the resistances R1 and R2 and capacitance C1 are determined such that the difference in value between the left side and the right side of Formula (8) for any current conduction period t is a fixed preset value or less. Regarding Formula (7), the constant K, reference voltage Vr, and resistance R1 are determined such that the values of left and right sides are the same.

When the plurality of constants of the temperature difference circuit 27 are determined as described above, the current flow in the temperature difference circuit 27 becomes similar to the heat conduction in the thermal circuit of the wire W. When the wire W generates heat in the thermal circuit of the wire W, heat is stored in the thermal capacitor 72. At this moment, the capacitor 82 is charged in the temperature difference circuit 27. In the thermal circuit of the wire W, heat is dissipated from the thermal capacitor 72 to the outside of the wire W. Accordingly, the wire W dissipates heat. When the amount of heat generated by the wire W is the same as the amount of heat dissipated from the thermal capacitor 72, the amount of heat stored in the thermal capacitor 72 is kept at a fixed value. At this moment, the voltage across the capacitor 82 is also kept at a fixed voltage. When the wire W dissipates heat, the capacitor 82 is discharged.

The voltage across the capacitor 82, that is, the output voltage of the temperature difference circuit 27 is generated based on the output current of the current output circuit 26, and increases as the temperature difference regarding the wire W increases. The output voltage of the temperature difference circuit 27 indicates the temperature difference regarding the wire W.

The temperature difference circuit 27 is an electric circuit corresponding to a thermal circuit of the single-stage Cauer model. The temperature difference circuit 27 is not limited to this electric circuit. The temperature difference circuit 27 may also be an electric circuit corresponding to the thermal circuit of the Foster model, multi-stage Cauer model, or the like.

Modifications of Embodiments 1 and 2

In Embodiments 1 and 2, the circuit board on which the microcomputer 25 is disposed is not limited to the control circuit board Bc. The microcomputer 25 may also be disposed on the switch circuit board Bs, for example. Also, the predetermined voltage is not limited to 0 V, and need only be a voltage to instruct to switch the power supply switch 20 off. Also, the power supply switch 20 need only be a switch that the driving circuit 21 can switch on or off. Therefore, the power supply switch 20 is not limited to an N-channel FET, and may also be a P-channel FET, a bipolar transistor, or a switch such as a relay contact.

The first switch 40 need only be a switch that is switched on or off according to the voltage between an input end to which a current is input and a control end. Therefore, the first switch 40 is not limited to a PNP bipolar transistor, and may also be a P-channel FET. The second switch 41 need only be a switch that is switched on when the first switch 40 is switched on. Therefore, the second switch 41 is not limited to an NPN bipolar transistor, and may also be an N-channel FET or a switch such as a relay contact. The source, drain, and gate of an FET respectively correspond to an emitter, a collector, and a base of a bipolar transistor.

The device that includes the latch circuit 22 is not limited to the power supply control device 12. A device that includes a switch that is switched on or off according to the output voltage of the latch circuit 22 is a first example of the device that includes the latch circuit 22. A device that includes an electric device that performs operations depending on the output voltage of the latch circuit 22 is a second example of the device that includes the latch circuit 22.

Embodiments 1 and 2 disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

The invention claimed is:

1. A latch circuit for fixing an output voltage to a predetermined voltage when a predetermined condition is satisfied, the latch circuit comprising:
   a first switch that has an input end to which a current is input, an output end from which a current is output, and a control end, and is switched from off to on when a voltage between the input end and the control end increases to a threshold voltage;
   a first resistor that is connected between the input end and the control end;
   a second resistor whose one end is connected to the control end;
   a second switch that has a second input end to which a resistor current that flows through in an order of the first resistor and the second resistor is input, and that is switched on when the first switch is switched on; and
   a third switch to which the resistor current is input,
   wherein when the second switch or third switch is on, a voltage across the first resistor is greater than or equal to the threshold voltage,
   a voltage is input to the input end of the first switch, and
   a voltage is output from the second input end of the second switch.

2. The latch circuit according to claim 1, further including,
   a third resistor and a fourth resistor,
   wherein the second switch further has a second output end from which a current is output, and a second control end,
   the second switch is switched from off to on when a voltage between the second output end and second control end increases to a second threshold voltage,
   the third resistor is connected between the output end of the first switch and the second control end of the second switch,
   the fourth resistor is connected between the second control end and second output end of the second switch, and
   a current flows through in an order of the first switch, the third resistor, and the fourth resistor.

3. A power supply control device for controlling power supply through a power supply switch, comprising:
   a voltage adjusting unit that is configured to output a voltage, and adjust the voltage to be outputted;
   a latch circuit configured to output a second voltage that depends on the outputted voltage of the voltage adjusting unit until a predetermined condition is satisfied, and fix the outputted second voltage to a predetermined voltage when a predetermined condition is satisfied; and
   a switching circuit configured to switch the power supply switch on or off depending on the second voltage of the latch circuit,
   wherein the latch circuit includes:
   a first switch that has an input end to which a current is input, an output end from which a current is output, and a control end, and is switched from off to on when a voltage between the input end and the control end increases to a threshold voltage;
   a first resistor that is connected between the input end and the control end;
   a second resistor whose one end is connected to the control end;
   a second switch that has a second input end to which a resistor current that flows in an order of through the first resistor to the second resistor is input, and is switched on when the first switch is switched on; and a third switch to which the resistor current is input, and when the second switch or third switch is on, a voltage across the first resistor increases, the output voltage of the voltage adjusting unit is input to the input end of the first switch, and a voltage is output to the switching circuit from the second input end of the second switch.

4. The power supply control device according to claim 3, wherein the latch circuit includes a second switching circuit configured to switch the third switch on or off, the second switching circuit switches the third switch on when a temperature difference between a wire temperature of a wire disposed on a current path of a current flowing through the power supply switch and an ambient temperature in a vicinity of the wire increases to a predetermined temperature difference, and the predetermined voltage is a voltage to instruct to switch the power supply switch off.

5. The power supply control device according to claim 3, further including, a second switching circuit configured to switch the third switch on or off;

a current output circuit configured to increase a current to be output as the current flowing through the power supply switch increases; and a temperature difference circuit configured to increase a voltage to be output as a temperature difference between a wire temperature of a wire disposed on a current path of a current flowing through the power supply switch and an ambient temperature in a vicinity of the wire increases, wherein the output voltage of the temperature difference circuit is generated based on an output current of the current output circuit, the second switching circuit switches the third switch on when the output voltage of the temperature difference circuit increases to a given voltage, and the predetermined voltage is a voltage to instruct to switch the power supply switch off.

* * * * *